Figure 1:
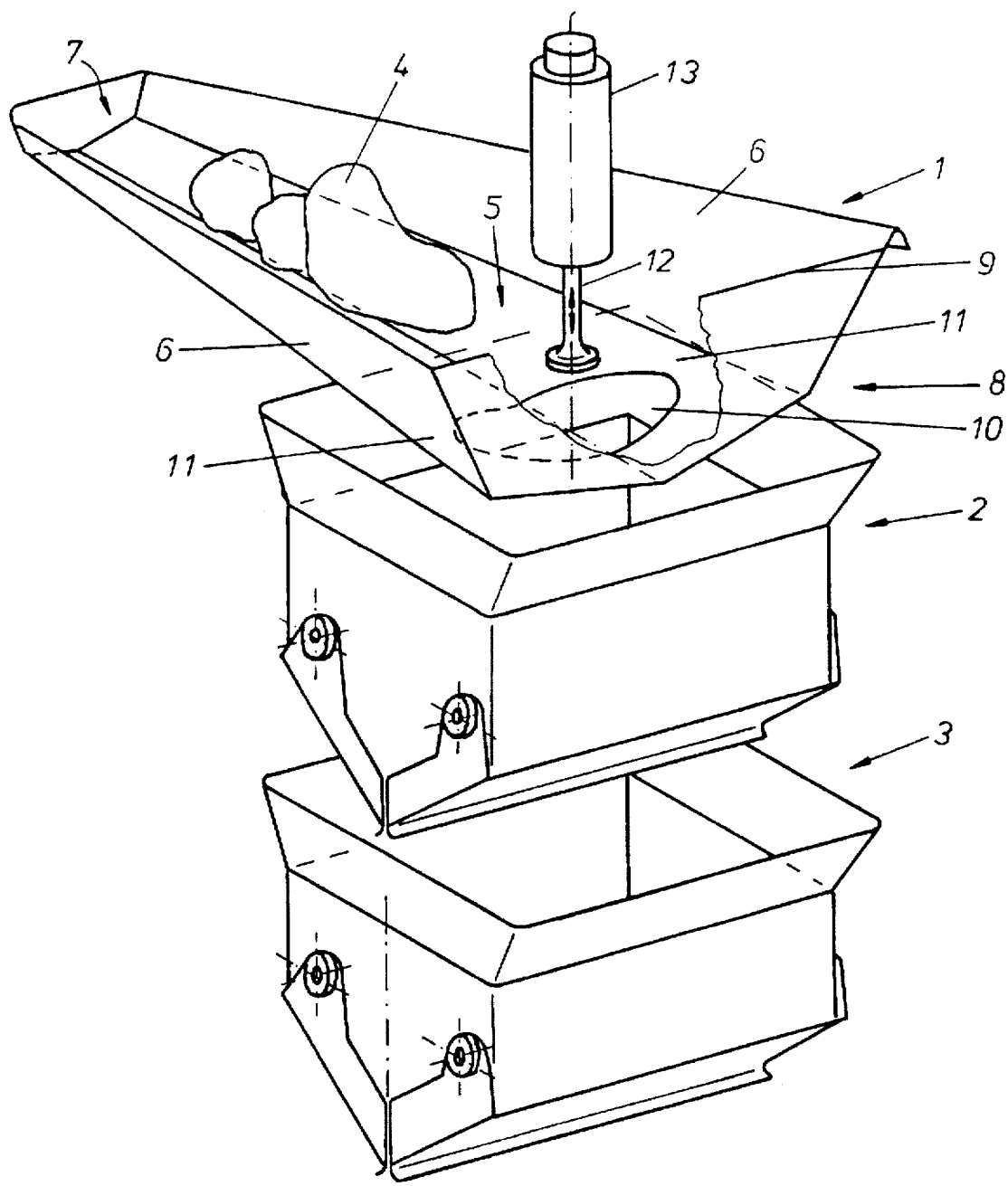

United States Patent [19]

Krämer sen. et al.

[11] Patent Number: 5,726,394

[45] Date of Patent: Mar. 10, 1998

[54] APPARATUS FOR CHARGING A WEIGHING DEVICE ARRANGED UPSTREAM OF A PACKING DEVICE WITH FRAGILE FOODSTUFFS OF IRREGULAR SIZE AND SIMILAR PRODUCTS, IN PARTICULAR POTATO CHIPS

[75] Inventors: Wilhelm Ludwig Krämer sen.; Wilhelm Ludwig Krämer jun., both of Waldkraiburg; Josef Schmidhuber, Kraiburg am Inn, all of Germany

[73] Assignee: Multipond GmbH, Waldkraiburg, Germany

[21] Appl. No.: 309,866

[22] Filed: Sep. 21, 1994

[30] Foreign Application Priority Data

Oct. 14, 1993 [DE] Germany ............... 43 35 074.7

[51] Int. Cl.$^6$ ............... G01G 13/00; B65B 1/30; B65B 37/00
[52] U.S. Cl. ............... 177/116; 177/119; 198/752.1; 241/283
[58] Field of Search ............... 177/25.18, 116, 177/119; 209/682; 198/758, 752.1; 241/283

[56] References Cited

U.S. PATENT DOCUMENTS

| | | | |
|---|---|---|---|
| 3,251,466 | 5/1966 | Fleishman | 209/682 |
| 3,308,898 | 3/1967 | Allen et al. | 177/116 |
| 3,308,947 | 3/1967 | Dundam | 209/682 |
| 3,308,994 | 3/1967 | Rohn | 177/25.18 |
| 3,540,668 | 11/1970 | Cummings | 241/283 |
| 3,578,094 | 5/1971 | Henry et al. | 177/119 X |
| 4,396,078 | 8/1983 | Minamida et al. | 177/1 |
| 4,398,614 | 8/1983 | Kakita et al. | 177/25.18 |
| 4,569,405 | 2/1986 | Oshima | 177/25.18 |
| 4,678,047 | 7/1987 | Kataoka et al. | 177/25.18 X |
| 4,901,807 | 2/1990 | Muskat et al. | 177/25.18 |
| 5,092,471 | 3/1992 | Pinizzotto et al. | 209/682 X |
| 5,104,048 | 4/1992 | Cecil et al. | 241/283 X |
| 5,409,137 | 4/1995 | Bonomelli | 222/56 |

FOREIGN PATENT DOCUMENTS

| | | |
|---|---|---|
| 0074826 A1 | 3/1983 | European Pat. Off. . |
| 0272666 A2 | 6/1988 | European Pat. Off. . |
| 052 498 B1 | 8/1988 | European Pat. Off. . |
| 3618041 A1 | 10/1987 | Germany . |
| 2042194 | 9/1980 | United Kingdom . |

*Primary Examiner*—Michael L. Gellner
*Assistant Examiner*—Randy W. Gibson
*Attorney, Agent, or Firm*—Wolf, Greenfield & Sacks, P.C.

[57] ABSTRACT

The invention relates to an apparatus for charging a weighing device arranged upstream of a packaging device with fragile foodstuffs of irregular size, in particular potato chips (4), comprising a dosing trough (1) with a free discharge side (8), a weighing container (3) and/or a storage container (2) arranged upstream of the weighing container (3). The dosing trough (1) is closed off at its free discharge side (8) by an end wall (9) and a discharge opening (10) is provided in the base (5) of the dosing trough (1) at the discharge side (8). The size of the discharge opening (10) defines a maximum target size relative to the size of the respective foodstuff (4) to be weighed and packaged. The base (5) of the dosing trough (1) forms an edge region (11) about the discharge opening (10) and a support for the foodstuff (4) exceeding the target size. At least one breaking apparatus (12, 13) is arranged upstream of each weighing device on the dosing trough (1), above the discharge opening (10) and controllable and moveable in the vertical direction. Means for controlling the breaking device (12, 13) are also provided.

11 Claims, 3 Drawing Sheets

APPARATUS FOR CHARGING A WEIGHING DEVICE ARRANGED UPSTREAM OF A PACKING DEVICE WITH FRAGILE FOODSTUFFS OF IRREGULAR SIZE AND SIMILAR PRODUCTS, IN PARTICULAR POTATO CHIPS

The invention relates to an apparatus for charging a weighing device arranged upstream of a packing device with fragile foodstuffs of irregular size and similar products, in particular potato chips, comprising a dosing trough with a free discharge side, a weighing container and/or a storage container arranged upstream of the weighing container.

In the packaging of foodstuffs, in addition to general technical foodstuff requirements, very high demands are also placed in the accuracy of the filling weight and the automatic handling of the partially mechanically extremely sensitive products. This is associated with considerable effort in particular in the case of fragile foodstuff products which are obtained from natural raw materials with a greatly varying size and weight and are therefore as a rule also of irregular sizes and/or weights as finished products, such as potato chips.

Conventional filling weighing machines, linearly arranged weighing machines or special partial quantity combination weighing machines are used for weighing the mentioned foodstuff products. Especially the partial quantity combination weighing machines are well suited to make up a filling weight, lying as close as possible to the preset target weight, from a plurality of individual portions of different weights. Partial quantities of different weights are weighed in storage containers and these partial weights are subsequently combined according to a special system to a filling weight of which the total of its partial weights comes closest to the preset target weight of the filling quantity. Very precise results may be achieved according to this method.

A packaging unit for potato chips is known which may consist of one or more dosing troughs, one or more weighing machines respectively provided with weighing containers, possibly also storage containers according to the type of weighing machine, and a packaging machine arranged downstream of one of the weighing machines. As a rule, the packaging machine is a bag forming, filling and sealing machine. The potato chips to be packaged are first conveyed via the dosing troughs into the weighing containers, weighed and then subsequently guided into a packaging bag via filling conduits and sealed in an air-tight manner.

During the prestep of the actual packaging step consisting of weighing and filling, it often occurs that potato chips which are too big obstruct both the weighing machines and the filling conduits of the packaging machines arranged downstream of the weighing machines, on account of which undesirable idle times occur in the weighing and packaging process.

To remedy this occurrence of obstructions in filling conduits, it is known to mount a pivotable push arm operating in time with the packaging unit at the top of a respective filling conduit in the packaging unit. The push arm cyclically pushes the potato chips in the filling conduit in the direction of the packaging bag.

However, this known apparatus has considerable disadvantages. For example, on account of the superimposed arrangement of the potato chips in a filling conduit, a plurality of potato chips of the entire quantity of the packaged contents are broken in the case of an obstruction into very small pieces, which is objectionable in marketing terms with regard to the end consumer. Additionally, the known apparatus takes up a lot of space at the location of the packaging machine, which is in any case very confined on account of a structure adapted to specific requirements. This leads to a structurally very complicated and thus costly form. Finally, the performance of the entire packaging unit is greatly limited on account of the unfavourable idle times resulting from the above-mentioned effects. Additionally, the occurrences of obstructions in the weighing machines arranged upstream of the packaging machines cannot be prevented or reduced in any way in the known apparatus.

The invention is therefore based on the technical problem of providing an apparatus which, in a simple and effective manner and without any unfavourable influence in marketing terms on the fragile foodstuffs or similar products, prevents an obstruction both of the filling conduit of the packaging machine and of the weighing machines arranged upstream of the packaging machine and thus guarantees a safe, functional and economical operation of these packaging device components.

This object is solved in accordance with the invention in that in the case of an apparatus for charging a weighing device arranged upstream of a packaging device with fragile foodstuffs of irregular size and similar products, in particular potato chips, comprising a dosing trough with a free discharge side, a weighing container and/or a storage container arranged upstream of one of the weighing containers, the weighing trough is closed at its free discharge side by an end wall and a discharge opening is provided in the base of the dosing trough at the discharge side, whereby the size of the discharge opening and packaged defines a maximum target size relative to the size of the respective foodstuff to be weighed, the base of the dosing trough forms an edge region about the discharge opening and a support for the foodstuffs exceeding the target size, at least one breaking apparatus is arranged upstream of the packaging device, above the discharge opening and controllable and moveable in the vertical direction, and means are provided for controlling the breaking apparatus.

The control of the breaking apparatus can be operated in time with the weighing machine or in another manner such as by means of a program control in connection with a sensor.

In accordance with the invention, the products similar to the fragile foodstuffs must not necessarily be food, and products or objects can also be understood under this term which are, for example, merely similar to the mentioned foodstuffs on account of their purely geometric or mechanical properties.

The apparatus according to the invention advantageously prevents the obstruction both of the weighing device and of the filling conduit of the packaging device arranged downstream of the weighing device, the measures necessary for this already taking place before entry of the goods to be weighed into the weighing device upstream of the packaging machine. In this way, idle times during weighing and packaging are prevented. The breaking device breaks the fragile foodstuffs or similar products exceeding the defined target size into relatively large pieces which now fall through the discharge opening in the base of the dosing trough so that an obstruction and a disadvantageous formation of crumbs is substantially avoided. This implies that only that single piece which is too large and lies over the discharge opening or a relatively small number of pieces are affected by the breaking step, but not a number of pieces jammed in the feeding conduit, as is the case for the known pushing devices. The total number of unavoidable broken pieces in a package is thus considerably reduced. Therefore, a product which meets marketing demands can be obtained. On account of the inventive discharge opening in the dosing trough and the edge region about the discharge opening, a support surface is provided by means of which the breaking into large pieces is made possible for the first time at all in constructive terms. The large broken pieces produced in this way free-fall through the discharge opening and must not subsequently be pushed into the filling conduit. The inventive apparatus, and in particular, the breaking apparatus, can be designed in a particularly space-saving manner, and it is easy and cheap to produce and operates very effectively and economically. This results in the performance of the entire packaging device being improved.

The breaking apparatus according to the invention is advantageously formed as a ram which can be operated either directly or indirectly by an actuator. This implies, for example, that the ram can be formed as a piston rod of a pneumatic or hydraulic cylinder, a push rod of an electric spindle motor or in connection with other actuators such as electromagnetic drives. For example, an indirect actuation implies an actuation by means of a shifting mechanism or the like.

It has proven to be advantageous that the plunger is limited in terms of its perpendicular path in the direction of the discharge opening in such a manner by the means for controlling the breaking apparatus and/or control device of the weighing machine that excessively large foodstuffs or similar products lying on the discharge opening are only just broken to still obtain large broken pieces which then fall through the discharge opening of the dosing trough.

On account of the fact that the discharge opening is round, oval, rectangular or formed in any other way, adaptation to the respective foodstuff or similar product to be weighed and packaged can be achieved in a positive way.

It is also provided for in a further advantageous embodiment that the discharge opening forms an exchangeable mouthpiece removable with the piece of the dosing trough including the edge region and the end wall from the remaining part of the dosing trough. In this manner, a very simple adaptation to different foodstuffs or other products to be packaged is also possible.

For advantageously simplifying the operation, maintenance and exchanging processes, the mouthpiece is connectable to the dosing trough without tools by means of one or more snap closures and/or with other securing means.

Additionally, the dosing trough and/or the mouthpiece is provided with guide members for this purpose.

In a particularly advantageous embodiment, the breaking apparatus is secured by means of a holding member arranged above the dosing trough, the holding member being straight, bent, ring-shaped or formed in some other way. On account of this measure, a space-saving and structurally favourable arrangement of the breaking apparatus as well as a positioning of the holding member which is adapted to the orientation of one or more dosing troughs is realized.

It has been shown to be advantageous that the holding member has means for transmitting energy and/or is itself formed as an energy carrier. Thus, the holding element can, for example, receive pneumatic or hydraulic pipes or electrical cables in its interior, or in the case of a design with the corresponding pressure-seal, can itself convey pressurised air or hydraulic fluid to supply the actuator for the ram of the breaking apparatus. The conveying of these means within the holding member is also favourable for reasons relating to the foodstuffs.

If the holding member consists of several individual parts connectable to one another, it can be easily opened or removed for laying energy-transferring means, for maintenance purposes or for accessing parts such as a weighing machine located beneath the holding member.

For this purpose, it is provided for in accordance with the invention that the individual parts of the holding member are rigid, flexible, pivotable and/or rotatable or other kinds of securing or coupling members for producing a connection between each other and/or have additional adapters for the means for transferring energy.

The above-described embodiments of the holding member can be realized in a particularly favourable manner by designing the holding member as a conduit or other suitable structural part.

Figure 2:
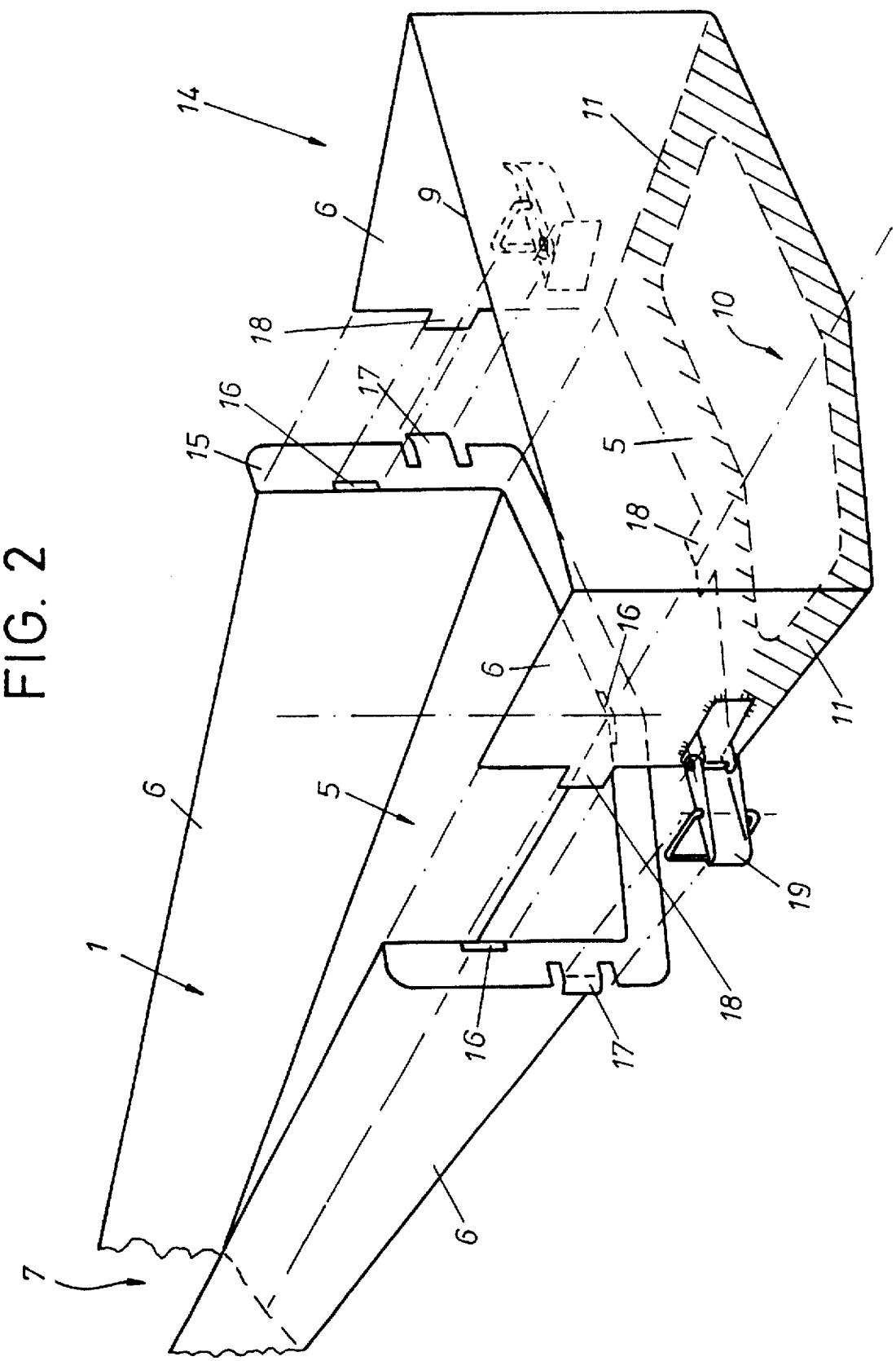
Figure 3:
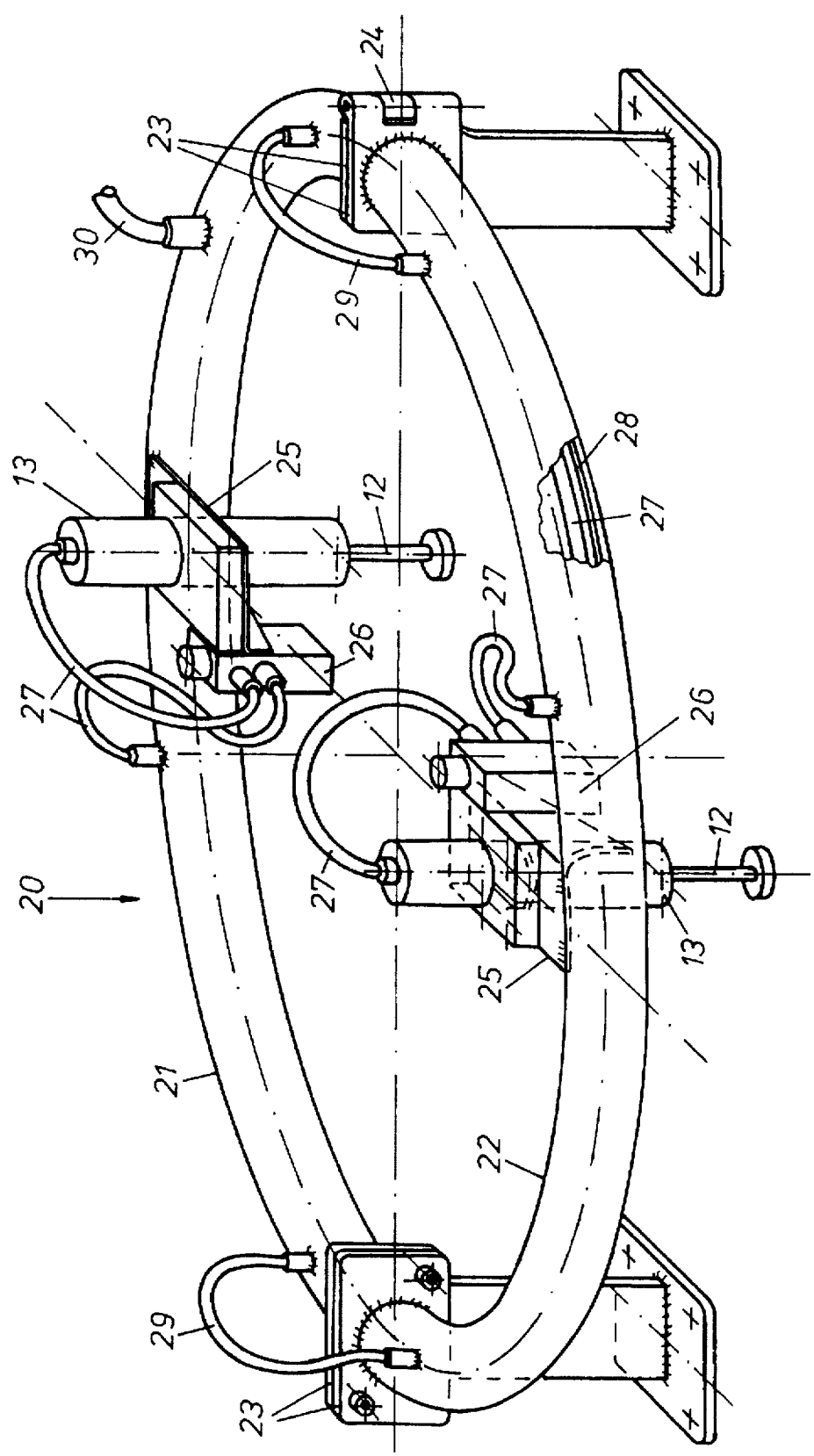

An example of the invention is described in the following with further detail and in advantageous embodiments with reference to the drawings, in which:

FIG. 1 shows a schematic perspective view of the apparatus according to the invention, FIG. 2 shows as further embodiment of the apparatus according to the invention in a schematic perspective view, and FIG. 3 snows a schematic perspective illustration of a holding member with two breaking apparatus.

In the following description of preferred embodiments of the apparatus according to the invention, the same structural parts or those similar in function respectively have the same reference signs in all figures insofar as an additional differentiation is not necessary.

As shown in FIG. 1, an embodiment of the apparatus according to the invention consists of a dosing trough 1, a storage container 2 located beneath the dosing trough 1, the storage container itself lying above the weighing container 3. Storage container 2 and weighing container 3 operate together according to the principle of the partial quantity combination weighing machine. The partial quantity combination weighing machine consisting of one or more weighing systems, which are usually arranged about the upper edge of a collecting hopper and of which only one weighing system or hopper is shown, is always provided at its hopper outlet with a packaging machine downstream thereof into the filling conduit of which the combined total weigh portion falls. Securing members or guides for the above components as well as adjacent or surrounding structures are not shown for reasons of better clarity.

The dosing trough 1 has a V-shaped symmetric base 5 with side walls 6 respectively adjoining thereto and extending upwardly and somewhat inclined to the sides, an inlet side 7 at which the goods to be weighed enter into the dosing trough 1, and a free discharge side 8 over which the goods to be weighed leave the dosing trough 1. The dosing trough 1 is provided with an electromagnetic vibration drive which transports the goods to the discharge side according to the known micro-motion process, controlled in terms of conveying performance by the control device of the weighing machine.

It is assumed in the following description that the goods to be weighed are potato chips 4 of different size and weight which are conveyed further to the packaging machine after weighing and then packaged. As is commonly known, potato chips are extremely fragile.

The free discharge side 8 of the dosing trough 1 is closed off in accordance with the invention by an end wall 9 and a discharge opening 10 is machined into the base 5 at the discharge side 8. The height of the end wall 9 is matched with that of the side walls 6 of the dosing trough 1. The size or diameter of the discharge opening 10 defines a maximum target size relative to the size of the potato chips 4 to be weighed and subsequently packaged. As a rule, this target size is an empirically or statistically determined value which represents a product size that under no circumstances leads to an obstruction of the weighing device by the goods to be weighed, namely of the storage container 2 and the weighing container 3, or of the filling conduit of the downstream packaging machine (not shown). Naturally, the target size can vary considerably from product to product. The shape of the discharge opening is also adapted to the respective product. In the present case, with potato chips 4 as the goods to be weighed, the discharge opening 10 has an oval to kidney-shaped form.

The width of the base 5 of the dosing trough 1, the size of the discharge opening 10 and the spacing of the end wall 9 from the edge of the discharge opening 10 are matched with one another in such a manner that the base 5 forms a relatively narrow edge region 11 about the discharge opening 10 relative to the size of the potato chips 4.

A ram 12 operating as a breaking apparatus and formed as a piston rod of a pressurised-air cylinder 13 is arranged centrally above the discharge opening 10. The ram 12 is moveable in the vertical direction. This is indicated by the arrows in FIG. 1.

Potato chips 4 guided at the inlet side 7 into the dosing trough 1 and substantially individualised by the vibration drive slide towards the discharge side 8, the potato chips 4 being oriented along the central longitudinal axis of the dosing trough 1 on account of the V-shaped base 5. In this manner, the potato chips 4 reach the discharge opening 10. Potato chips 4 lying within the preset target size fall unhindered through the discharge opening 10 and enter the storage container 2 or directly into the weighing container 3.

A potato chip 4 which exceeds the target size, i.e. one which is too big, is conveyed centrally over the discharge opening 10 and comes to lie on the edge region 11 located about the discharge opening 10. The end wall 9, with its spacing from the edge of the discharge opening 10 matched to the size of the potato chips 4, in this case carries out a stopping function and ensures this pertinent position of a potato chip 4 for the following breaking step.

The ram 12 operated according to a certain mode such as in time with the weighing device or by means of an electronic program control presses during a downward movement from above onto the potato chip lying over the discharge opening 10 and on top of the edge region 11 and breaks this into several relatively large broken pieces which fall through the discharge opening 10 into the storage container 2.

All weighing containers 3 of the weighing system of a partial quantity combination weighing machine therefore only contain potato chips 4 or broken parts thereof which lie within the target size predetermined by the discharge opening 10 so that neither the storage container 2 nor the filling conduit or other parts of the downstream packaging machine can become obstructed.

In designing the ram 12, it is to be taken into account that the ram diameter is not too small and possibly only penetrates through the potato chip and does not break this, which inevitably leads to faulty operation. The ram 12 is also limited in its perpendicular path in the direction of the discharge opening 10 by electromagnetic control valves 26 so that only the excessively large potato chips 4 lying over the discharge opening 10 are broken.

A further embodiment of the apparatus according to the invention can be seen in FIG. 2. The basic design of this apparatus corresponds to that according to FIG. 1 as described in detail above.

In accordance with FIG. 2, the part of the dosing trough 1 including the discharge opening 10 with the edge region 11 and the end wall 9 forms an exchangeable separate mouthpiece 14 removable from the remaining part of the dosing trough 1. The discharge opening 10 of the mouthpiece 14 is substantially rectangular in the present example. For more clarity, the edge region 11 is hatched in the drawing.

The dosing trough 1 has a flange-like shoulder 15 with guiding slots 16 and an abutment 17 at its free side lying opposite its inlet side 7.

At the free side of the mouthpiece 14 lying opposite the shoulder 15 of the dosing trough 1, there are rectangular guiding projections 18 at the side walls 6 and the base 5 which correspond to the guide slots 16 of the shoulder 15. The mouthpiece 14 can be easily placed onto the dosing trough 1 in this manner. By means of hinged closures 19 fixed to the sides and outside of the side walls 6 of the mouthpiece 14, a secure but rereleaseable connection with the dosing trough 1 is produced. For connection, the clamps of the hinged closures 19 grip around the abutments 17 on the shoulder 15 of the dosing trough 1.

In using one and the same dosing trough 1, a broad spectrum of products and different weighing systems are covered by means of different desirably exchangeable mouthpieces 14 correspondingly formed for the respective specific requirements.

In FIG. 3, a holding member 20 according to the invention is shown for two breaking apparatus consisting of pressurised-air cylinders 13 with rams 12 formed as piston rods. The holding member 20 is mounted above two dosing troughs—not shown for purposes of clarity in the drawing—each dosing trough being associated with one of the breaking apparatus.

The holding member 20 is formed of two semicircular arcuate tube pieces 21, 22 which are closed into a torus by means of flanges 23 at their ends. The pressurised-air cylinder 13 with its rams 12 as well as a respective electromagnetic control valve 26 for the pressurised-air cylinder 13 are mounted securely to the tube pieces 21, 22 by means of carrier plates 25. Two of the respectively opposing flanges 23 of both tube pieces 21, 22 have a hinge member 24 so that by releasing only one flange connection, the torus is opened and the interior of the tube pieces 21, 22 becomes accessible.

Pressurised-air piping 27 for supplying the pressurised-air cylinder 13 and electrical cables for driving the electromagnetic control valves 26 are laid inside the tube pieces 21, 22. In order to prevent awkward releasing of the pressurised-air piping 27 and the electrical cables 28 when disassembling the tube pieces 21, 22, these are led out of the tube pieces 21, 22 shortly in front of the flanges 23 and connected via the mentioned connecting positions from tube piece 21 to tube piece 22 by means of appropriately flexible and sufficiently long adapters 29. A feed member 30 for the pressurised-air piping 27 and the electrical cable 28 leads to a pressurised-air source and an electrical energy source and/or a control device (not shown).

We claim:

1. An apparatus for charging a weighing device arranged upstream of a packaging device with fragile foodstuffs, comprising:

a dosing trough for receiving said fragile foodstuffs having a free discharge side and a base;

a discharge opening passing through said base at said free discharge side;

a storage container for receiving the foodstuffs passing through said discharge opening;

a weighing container arranged downstream of the storage container;

said discharge opening sized for passage of maximum footstuffs desired;

at least one ram substantially aligned with said discharge opening, wherein said ram only moves in a plane substantially orthogonal to said discharge opening; and means for moving said ram to break the foodstuffs.

2. The apparatus as set forth in claim 1, further comprising a drive means, said drive means for actuating said ram substantially orthogonal to said dosing trough.

3. The apparatus as set forth in claim 2, wherein said ram moves over a limited path thereby breaking substantially only large footstuffs.

4. The apparatus as set forth in claim 1, wherein said discharge opening has dimensions sized for a particularly shaped foodstuff.

5. The apparatus as set forth in claim 1, wherein said free discharge side is releasably secured to said dosing trough.

6. The apparatus as set forth in claim 5, further comprising at least one quick-release closure for releasably securing said free discharge side to said dosing trough.

7. The apparatus as set forth in claim 5, further comprising a first set of guides on said dosing trough and a second set of guides on said free discharge end, said first and second sets positioned in mating alignment.

8. The apparatus as set forth in claim 1, further comprising a holding member for suspending said ram above said dosing trough.

9. The apparatus as set forth in claim 8, wherein said holding member is tubular.

10. The apparatus as set forth in claim 1, wherein said dosing trough is closed off at its free discharge side by an end wall.

11. The apparatus as set forth in claim 1, wherein said base of said dosing trough forms an edge region about said discharge opening and a support for foodstuffs exceeding a maximum target size.

* * * * *